United States Patent [19]
Guerra

[11] Patent Number: 6,038,118
[45] Date of Patent: Mar. 14, 2000

[54] LIGHTNING PROTECTOR SYSTEM

[76] Inventor: Charles R. Guerra, 10413 Old St. Augustine Rd., Jacksonville, Fla. 32257

[21] Appl. No.: 09/189,475

[22] Filed: Nov. 10, 1998

[51] Int. Cl.$^7$ ...................................................... H02H 3/22
[52] U.S. Cl. .............................. 361/111; 361/118; 307/66; 307/86
[58] Field of Search ........................... 361/111, 117–118; 307/64, 66, 86

[56] References Cited

U.S. PATENT DOCUMENTS

| | | | |
|---|---|---|---|
| 4,628,396 | 12/1986 | Flemming | 361/91 |
| 4,823,228 | 4/1989 | Bittner | 361/218 |

Primary Examiner—Michael J. Sherry
Attorney, Agent, or Firm—Thomas C. Saitta

[57] ABSTRACT

A lightning detector system which includes a radio frequency (RF) detector assembly which receives input from an antenna and a line sensor in order to sense signatures of compromising events such as lightning strikes or transient line events caused by power grid loss, transformer breakdown, switching surges or load induced events. A central processing unit (CPU) isolates the equipment from the power grid and simultaneously causes AC current to be supplied to the equipment only from storage cells. The CPU and detection devices are continually powered by power from the storage cells rather than directly from the AC power grid. The system also incorporates a timer or counter device, such that the system will convert back to AC power from the grid if no subsequent triggering event occurs within a preset time period.

19 Claims, 2 Drawing Sheets

LIGHTNING PROTECTOR SYSTEM

BACKGROUND OF THE INVENTION

This invention relates generally to protection systems for electrically powered or dependent appliances or equipment, such as computers, televisions, stereos, microwaves and the like, which are susceptible to damage from high intensity transient line events, i.e., power surges, caused by lightning strikes or ground fault events. More particularly, the invention relates to such systems where the equipment is isolated from the AC power grid when a transient event occurs and backup power from storage cells is instantaneously supplied to the equipment such that operations are not interrupted. Even more particularly, the invention relates to such systems where the equipment is isolated and the auxiliary power is supplied upon the detection of a high intensity electromagnetic frequency (EMF) burst from a lightning strike which has occurred at a relatively remote distance before the storm is within range to damage the equipment.

Modern electronic and electrically powered equipment are very susceptible to damage from transient line events, often referred to generally as power surges. These transient line events can be caused by power grid loss, local transformer breakdown, switching surges and load inducing events. Probably the most damaging high intensity transient line events are those caused by nearby lightning strikes during a storm, whether in the form of direct strikes to a power grid or as a result of the electromagnetic field of nearby strikes. Conventional devices to protect equipment from damage from transient line events include fuses, circuit breakers and surge suppressor devices. These devices react to the transient line event itself, in that the protective action is not initiated until the power surge or spike reaches the device, and are often inadequate to protect highly sensitive electronic equipment from damage from the intense power level and rise time of a lightning strike—i.e., the equipment is already damaged before the protective device can react.

In order to address the problem of lightning strikes, it is an object of this invention to provide a protective system which is initiated well in advance of any lightning derived transient line events affecting the equipment being protected. This and other objects, which will be clear from the subsequent discussion, are accomplished by providing a system which detects the occurrence of lightning strikes at a relatively remote distance and before any power surge or spike resulting from a lightning strike can be delivered to the equipment through the AC power grid. When a strike is detected which meets the criteria of the system, the equipment is immediately isolated from the AC power grid and auxiliary power converted from DC storage cells is supplied to operate the equipment without interruption. After a predetermined time period with no further lightning strikes, the equipment is reconnected to the AC power grid. It is a further object to provide such a system which can also detect non-lightning induced transient line events and respond in the same manner by isolating the equipment and supplying auxiliary power. It is a further object to provide such a system where the distant lightning strike can be detected in various ways.

SUMMARY OF THE INVENTION

The invention is a protection system for electrically powered appliances and equipment, such as computers, televisions, stereos, microwaves and the like, which are susceptible to damage from high intensity power transients resulting from lightning strikes. The system operates in an anticipatory manner rather than in a purely reactive manner, in that the system detects lightning strikes from an approaching storm before the storm is close enough for the lightning strikes to damage the equipment by creating high intensity transient line events delivered to the equipment through the AC power grid. The system includes a radio frequency (RF) detector assembly which receives input from an antenna and a line sensor in order to sense signatures of compromising events such as lightning strikes or transient line events caused by power grid loss, transformer breakdown, switching surges or load induced events. When the extremely large EMF burst from a lightning strike is detected at a distance, or upon detection of the other enumerated transient line events, a central processing unit (CPU) isolates the equipment from the power grid and simultaneously causes AC current to be supplied to the equipment only from storage cells. An inverter transformer unit converts the DC current of the storage cells to AC current. The CPU and detection devices are continually powered by power from the storage cells rather than directly from the AC power grid. The system also incorporates a timer or counter device, such that the system will convert back to AC power from the grid if no subsequent triggering event occurs within a preset time period. Alternatively, the system can be set to activate only if two transient events occur within a given time period.

DETAILED DESCRIPTION OF THE INVENTION

The primary application of the system is to protect computer and other sensitive equipment from power surges due to nearby lightning strikes, as well as to protect the equipment from power surges due to high or low voltage events or ground-fault situations. Lightning can produce damaging surges by hits on or near the power grid system supplying power to the computer or hits to the telephone or cable lines. The system provides protection in response to signatures from distant lightning strikes occurring before the storm is close enough to the equipment to inflict damage, as well as providing protection in response to first event lightning strikes within a distance capable of inflicting damage by line surges in the power grid.

Figure 1:
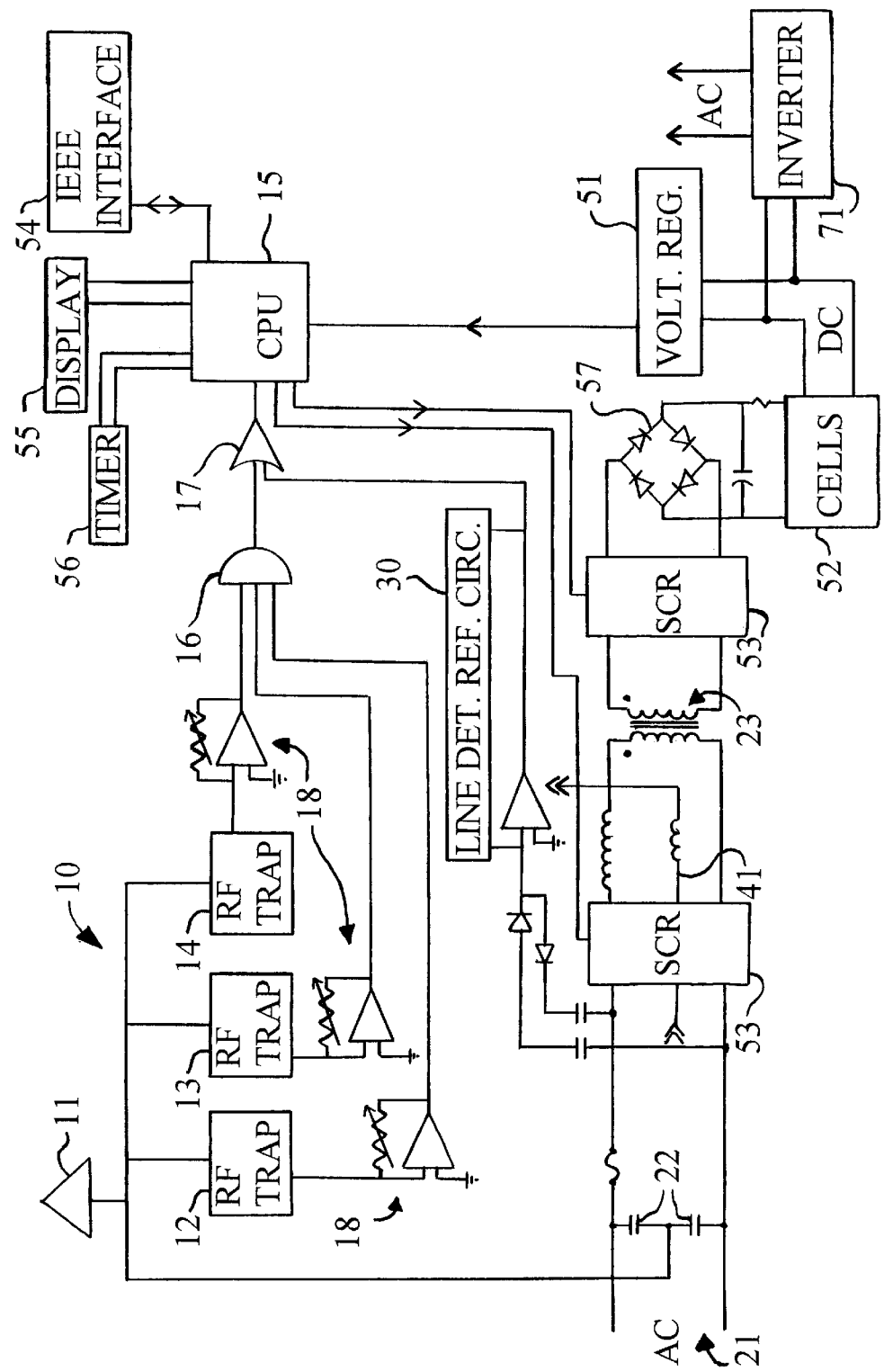
FIG. 1 is a schematic diagram of the equipment and circuitry of the lightning protection system.
Figure 2:
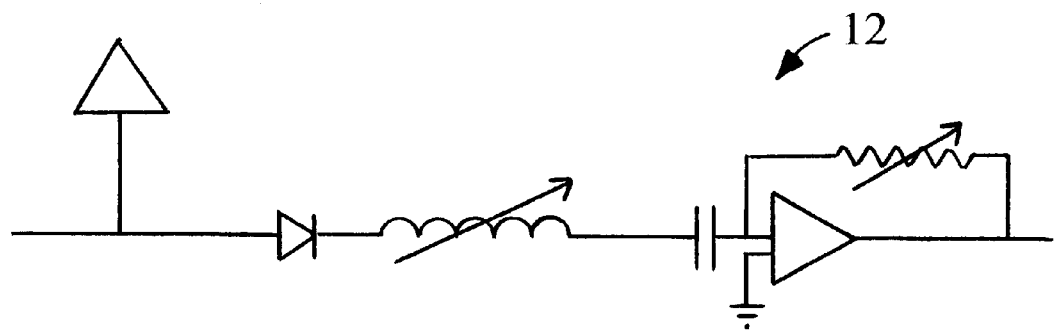
FIG. 2 is a schematic diagram of a typical RF trap circuit.

Distant lightning is detected in two ways. The first detection means 10 detects radio frequency (RF) events and comprises an antenna 11 connected to a series of RF trap circuits 12, 13, 14 tunable by tuners 18 used to define and identify the bandwidth of a lightning RF signature. The antenna 11 is of a type capable of picking up signals in the 600 to 640 MHz frequency range. The RF detection system 10 senses a lightning strike through an AM radio detector which is frequency tunable to exclude radio broadcast signals and other RF non-lightning events, discriminating against background EMF events by utilizing a comb filter/AM trap circuit to isolate the broad signal characteristics of a lightning strike. The radio detector is also range sensitive through gain control such that a particular safety radius can be designated for detection based on signal strength parameters. The RF detection system 10 converts lightning signals to a DC voltage pulse which is monitored by the central processing unit (CPU) 15. In the system as shown, three RF traps 12, 13, 14 are utilized to distinguish the broad lightning signal from other possible signals such as CB band or electrical appliance interference, but other numbers of traps could be utilized. One RF trap 12 is set for lower frequencies, one RF trap 13 for medium frequencies and the third RF trap 14 for higher frequencies. Each RF trap circuit 12, 13, 14, a typical schematic of which is shown in FIG. 2, is output connected to an AND logic gate 16 which requires simultaneous input from all RF traps 12, 13 and 14 to send a signal to the CPU 15 for command switching, which prevents false switching in response to other signals.

Lightning events are also detected through the main AC power grid 21. The antenna 11 is connected through capacitors 22 to the main AC input to sense RF/static signatures occurring on the local power grid. This information is likewise processed through the RF trap circuits 12, 13, 14 to filter out any non-lightning signatures. In the event that a lightning signature is detected, the three RF traps 12, 13, 14 signal the AND logic gate 16, which initiates the CPU 15.

Figure 3:
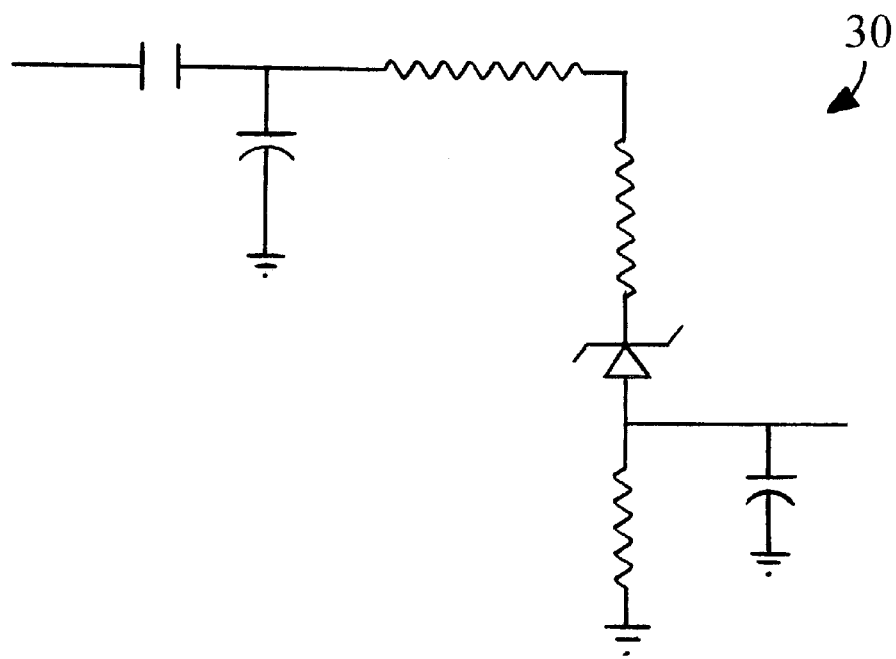
FIG. 3 is a schematic diagram of a typical voltage reference circuit.

High, low and ground-fault events are processed through a line detector reference circuit 30, a typical design for which is shown in FIG. 3, attached to the incoming AC line 21 which sends an initiation voltage to the CPU 15 when any event involving voltage change from the reference voltage parameters of the AC circuit 21 occurs. The line detector circuit 30 differentiates between catastrophic events and transient events, and preferably responds to three inputs—a drop in voltage due to ground-faults, a drop in voltage due to other low voltage events, and an increase in voltage due to high voltage events. The reference circuit 30 is set to initiate the CPU 15 through an OR logic gate 17 when the detected voltage changes a predetermined amount, such as for example 10 percent. Both the RF detection circuit 10 and the low/high/ground-fault detection circuit 30 have outputs which are fed to an OR logic gate 17, such that a signal will be sent to the CPU 15 and protective action will be initiated if either or both of the detection circuits detects a potentially harmful event.

Any telephone/cable lines 41 connected to the computer equipment are preferably optically isolated from the system so that line surges are not delivered to the equipment through a modem or direct cable connection. Ring voltage is supplied from the voltage regulator 51.

The CPU 15 preforms several control functions upon receipt of a voltage signal from the detector circuits 10 or 30. The CPU 15 and the RF traps 12, 13, 14 are continually powered by power converted from the power storage cells or batteries 52. Using silicon controlled rectifiers (SCR) 53, in the event of initiation by the RF trap or low/high/ground-fault detection systems 10 or 30, the CPU 15 switches the AC line 21 off at points before and after an isolation transformer 23 in the AC circuit 21. This reduces phase bounce and provides stable switching to storage cell 52 operation where the computers or other devices are operated on power supplied by the storage cells 52 isolated from the AC grid 21. The CPU 15 triggers other subsystems upon the occurrence of a lightning event, including if desired instructing the computer through the use of IEEE interface 54 protocol to back-up files, initiate other sub-programs or shut down. The CPU 15 monitors voltage at a voltage regulator circuit 51 to determine storage cell 52 capacity and to feed current to the detection circuits 10 and 30. The CPU 15 also may drive a display unit 55 to indicate system status. The CPU 15 is also used to synchronize AC phasing to minimize variation in voltage during the power source switching operation.

Concurrently with a lightning event signal being sent to the CPU from the RF detection circuit 10 or low/high/ground-fault detection circuit 30, a timer circuit 56 initiates and counts a predetermined time period, such as for example twenty minutes. Any subsequent event resets the timer circuit 56 to zero and counting is resumed. The equipment remains isolated from the main power circuit 21 until a predetermined time after the last event is detected. When the timer circuit 56 times out with no new events, the CPU 15 switches the system back to the main AC power grid 21.

The main AC power line 21 is fused after the RF detection point in the circuit so that the systems remain separated, with the next junction being the taps for the high/low/ground-fault detection circuit 30. The first SCR 53 is next in line, which acts as an isolation relay when energized by the CPU 15. A one-to-one isolation transformer 23 adds a further isolation means and helps to limit current changes. On the far side of the transformer 23 is the second SCR 53 which completes circuit isolation upon command of the CPU 15. During non-lightning periods, the AC is fed to a full wave bridge rectifier 57 and converted to DC voltage, which is fed through regulator circuits 51 to charge the storage cells 52.

The storage cells 52 comprise the off-line power system. The status of the storage cells 52 is monitored by the CPU 15 through the regulator circuit 51 and the result may be externally displayed. The cells 52 are connected to an AC inverter 71 which converts output DC voltage to AC to power the off-line system. All of the detection circuits 10, the reference circuits 30 and the CPU 15 are continually run from the voltage taken at the regulator circuits 51 so that none of these are affected by line events. Preferably, the computer or other equipment being protected are also always powered through the storage cells 52 and inverter assembly 71.

In the first protection scenario, lightning occurs some distance beyond the minimum safety radius, such as 6 to 12 miles away. The antenna 11 picks up the RF signal and feeds it to the RF traps 12, 13, 14, the signal being broad enough in frequency to trigger all the AND inputs in the logic gate 16. This sends an activation signal to the CPU 15 which activates the timer circuit 56, activates the SCR relays 53 to simultaneously disconnect the protected system from the main AC power grid 21 such that the equipment is now powered solely by the stored power in the DC storage cells 52, and activates the IEEE interface 54 to initiate the back-up/shut down programs as desired. Should lightning re-occur within the predetermined time period, the timer circuit 56 zeros out and a new time count begins. Once no new lightning event occurs within the timer period, the system is switched back to main AC power such that the storage cells 52 are recharged.

In a second scenario, lightning strikes the AC power grid 21 directly. The event is detected at the AC/antenna tap and is treated as above. In a third scenario, a high/low/ground-fault event occurs and is compared by the tunable reference circuit 30 tap to preset parameters, sending an activation signal through the OR logic gate 17 to the CPU 15 if the event differs from the preset parameters. It is also possible to set a shorter timer circuit period for high/low/ground-fault events, as these tend to be more linear in character and less catastrophic, with standard suppression circuitry able to handle most such events.

It is understood that equivalents and substitutions for certain elements and components set forth above may be obvious to those skilled in the art, and thus the true scope and definition of the invention is to be as set forth in the following claims.

I claim:

1. A lightning protector system for protecting and isolating sensitive electrically powered equipment from high intensity transient line events, the system comprising:

means to detect and identify the radio frequency signature of a distant lightning strike;

means to isolate electrically powered equipment from an AC power grid in response to detection of said radio frequency signature;

storage cells to provide electrical power to said equipment when said equipment is isolated from said AC power grid, where said storage cells are recharged by power from said AC power grid;

where said detection and identification means and said isolation means are continuously powered by said storage cells.

2. The system of claim 1, further comprising means to detect a distant lightning strike through a transient line event in said AC power grid, where said isolation means also isolates said equipment in response to detection of said transient line event.

3. The system of claim 1, further comprising means to detect high, low and ground-fault events in said AC power grid, where said isolation means also isolates said equipment in response to detection of said high, low or ground-fault event.

4. The system of claim 2, further comprising means to detect high, low and ground-fault events in said AC power grid, where said isolation means also isolates said equipment in response to detection of said high, low or ground-fault event.

5. The system of claim 1, where said detection and identification means comprises an antenna and a plural number of radio frequency traps, each of said radio frequency traps being set for a different frequency range.

6. The system of claim 1, where said equipment is continuously powered by said storage cells.

7. The system of claim 2, where said equipment is continuously powered by said storage cells.

8. The system of claim 3, where said equipment is continuously powered by said storage cells.

9. The system of claim 4, where said equipment is continuously powered by said storage cells.

10. The system of claim 1, further comprising a timer circuit to control said isolation means.

11. A lightning protector system for protecting and isolating sensitive electrically powered equipment from high intensity transient line events, the system comprising:

means to detect and identify the radio frequency signature of a distant lightning strike;

means to isolate electrically powered equipment from an AC power grid in response to detection of said radio frequency signature;

storage cells to provide electrical power to said equipment when said equipment is isolated from said AC power grid, where said storage cells are recharged by power from said AC power grid; and a timer circuit to determine when to stop isolation of said electrically powered equipment from an AC power grid, where said timer circuit is initiated upon detection of said radio frequency signature and begins counting from zero for a predetermined period of time, and further where detection of another radio frequency signature of a subsequent lightning strike occurring within said predetermined time period causes said timer circuit to reset and start counting from zero said predetermined time period, such that said electrically powered equipment remains isolated from said AC power grid until said predetermined period of time passes with no subsequent lightning strikes.

12. The system of claim 11, further comprising means to detect a distant lightning strike through a transient line event in said AC power grid, where said isolation means also isolates said equipment in response to detection of said transient line event.

13. The system of claim 11, further comprising means to detect high, low and ground-fault events in said AC power grid, where said isolation means also isolates said equipment in response to detection of said high, low or ground-fault event.

14. The system of claim 12, further comprising means to detect high, low and ground-fault events in said AC power grid, where said isolation means also isolates said equipment in response to detection of said high, low or ground-fault event.

15. The system of claim 11, where said detection and identification means comprises an antenna and a plural number of radio frequency traps, each of said radio frequency traps being set for a different frequency range.

16. The system of claim 11, where said equipment is continuously powered by said storage cells.

17. The system of claim 12, where said equipment is continuously powered by said storage cells.

18. The system of claim 13, where said equipment is continuously powered by said storage cells.

19. The system of claim 14, where said equipment is continuously powered by said storage cells.

* * * * *